US008453741B2

(12) United States Patent  
van Zanten

(10) Patent No.: US 8,453,741 B2
(45) Date of Patent: Jun. 4, 2013

(54) TETHERED POLYMERS USED TO ENHANCE THE STABILITY OF MICROEMULSION FLUIDS

(75) Inventor: Ryan van Zanten, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 364 days.

(21) Appl. No.: 12/888,539

(22) Filed: Sep. 23, 2010

(65) Prior Publication Data

US 2012/0073817 A1 Mar. 29, 2012

(51) Int. Cl.
*E21B 43/25* (2006.01)

(52) U.S. Cl.
USPC .......................................... 166/305.1; 166/300

(58) Field of Classification Search
None
See application file for complete search history.

(56) References Cited

U.S. PATENT DOCUMENTS

| | | | |
|---|---|---|---|
| 2,779,418 A | 1/1957 | Garst | |
| 2,935,129 A | 5/1960 | Allen et al. | |
| 4,695,389 A | 9/1987 | Kubala | |
| 4,725,372 A | 2/1988 | Teot et al. | |
| 5,030,366 A | 7/1991 | Wilson et al. | |
| 5,309,999 A | 5/1994 | Cowan et al. | |
| 5,314,022 A | 5/1994 | Cowan et al. | |
| 5,361,842 A | 11/1994 | Hale et al. | |
| 5,373,901 A | 12/1994 | Norman et al. | |
| 5,515,921 A | 5/1996 | Cowan et al. | |
| 5,551,516 A | 9/1996 | Norman et al. | |
| 5,663,123 A | 9/1997 | Goodhue, Jr. et al. | |
| 5,804,535 A | 9/1998 | Dobson et al. | |
| 5,879,699 A | 3/1999 | Lerner | |
| 5,979,555 A | 11/1999 | Gadberry et al. | |
| 5,996,692 A | 12/1999 | Chan et al. | |
| 6,063,737 A | 5/2000 | Haberman et al. | |
| 6,063,738 A | 5/2000 | Chatterji et al. | |
| 6,239,183 B1 | 5/2001 | Farmer et al. | |
| 6,283,213 B1 | 9/2001 | Chan | |
| 6,435,277 B1 | 8/2002 | Qu et al. | |
| 6,444,316 B1 | 9/2002 | Reddy et al. | |
| 6,506,710 B1 | 1/2003 | Hoey et al. | |
| 6,527,051 B1 | 3/2003 | Reddy et al. | |
| 6,547,871 B2 | 4/2003 | Chatterji et al. | |
| 6,554,071 B1 | 4/2003 | Reddy et al. | |
| 6,831,043 B2 | 12/2004 | Patel et al. | |
| 6,881,709 B2 | 4/2005 | Nelson et al. | |
| 6,908,888 B2 | 6/2005 | Lee et al. | |
| 7,060,661 B2 | 6/2006 | Dobson, Sr. et al. | |
| 7,081,439 B2 | 7/2006 | Sullivan et al. | |
| 7,084,095 B2 | 8/2006 | Lee et al. | |
| 7,159,659 B2 | 1/2007 | Welton et al. | |
| 7,238,648 B2 | 7/2007 | Dahayanake et al. | |
| 7,279,446 B2 | 10/2007 | Colaco et al. | |
| 7,293,609 B2 | 11/2007 | Dealy et al. | |
| 7,299,874 B2 | 11/2007 | Welton et al. | |
| 7,303,019 B2 | 12/2007 | Welton et al. | |
| 7,320,952 B2 | 1/2008 | Chen et al. | |
| 7,341,980 B2 | 3/2008 | Lee et al. | |
| 7,351,681 B2 | 4/2008 | Reddy et al. | |
| 7,387,987 B2 | 6/2008 | Chen et al. | |
| 7,527,103 B2 | 5/2009 | Huang et al. | |
| 7,547,663 B2 | 6/2009 | Kirsner | |
| 7,858,561 B2 | 12/2010 | Abad et al. | |
| 7,985,718 B2 * | 7/2011 | Steinbrenner et al. | 507/265 |
| 8,053,396 B2 * | 11/2011 | Huff et al. | 507/246 |
| 8,148,303 B2 | 4/2012 | Van Zanten et al. | |
| 2002/0193257 A1 | 12/2002 | Lee et al. | |
| 2003/0054962 A1 | 3/2003 | England et al. | |
| 2003/0134751 A1 | 7/2003 | Lee et al. | |
| 2004/0043905 A1 | 3/2004 | Miller et al. | |
| 2005/0107265 A1 | 5/2005 | Sullivan et al. | |
| 2005/0107503 A1 | 5/2005 | Couillet et al. | |
| 2005/0119401 A1 | 6/2005 | Bavouzet et al. | |
| 2005/0194145 A1 | 9/2005 | Beckman et al. | |
| 2005/0252659 A1 | 11/2005 | Sullivan et al. | |
| 2006/0046937 A1 | 3/2006 | Fu et al. | |
| 2006/0081372 A1 | 4/2006 | Dealy et al. | |
| 2006/0128597 A1 | 6/2006 | Chen et al. | |
| 2006/0183646 A1 | 8/2006 | Welton et al. | |
| 2006/0258541 A1 | 11/2006 | Crews | |
| 2007/0012445 A1 | 1/2007 | Nguyen et al. | |
| 2007/0066491 A1 | 3/2007 | Bicerano et al. | |
| 2007/0114022 A1 | 5/2007 | Nguyen | |
| 2007/0123431 A1 | 5/2007 | Jones et al. | |
| 2007/0215355 A1 | 9/2007 | Shapovalov et al. | |
| 2007/0281869 A1 | 12/2007 | Drochon et al. | |
| 2007/0284103 A1 | 12/2007 | Dealy et al. | |

(Continued)

FOREIGN PATENT DOCUMENTS

EP 0 037 699 A2 10/1981
EP 2 085 448 A1 8/2009

(Continued)

OTHER PUBLICATIONS

International Search Report and Written Opinion for PCT/GB2011/001386 dated Dec. 2, 2011.
Penny et al., "The Application of Microemulsion Additives in Drilling and Stimulation Results in Enhanced Gas Production," 2005 SPE Production and Operations Symposium held in Oklahoma City, OK, SPE 94274.
International Search Report and Written Opinion for PCT/GB2011/001136 dated Sep. 29, 2011.
International Search Report and Written Opinion for PCT/GB2011/000988 dated Oct. 12, 2011.
Office Action for U.S. Appl. No. 12/551,334 dated Jul. 21, 2011.
International Search Report and Written Opinion for PCT/GB2012/000411 dated Jul. 19, 2012.
International Search Report and Written Opinion for PCT/GB2010/001630 dated Oct. 19, 2010.

(Continued)

*Primary Examiner* — Angela M DiTrani

(74) *Attorney, Agent, or Firm* — Craig W. Roddy; McDermott Will & Emery LLP

(57) ABSTRACT

Treatment fluids may include an aqueous fluid, a microemulsion surfactant, and an amphiphilic polymer that itself includes a hydrophobic component and a hydrophilic component. Such treatment fluids may be utilized in subterranean formations such that the microemulsion surfactant forms a microemulsion that comprises the amphiphilic polymer within the subterranean formation.

7 Claims, No Drawings

U.S. PATENT DOCUMENTS

| | | | |
|---|---|---|---|
| 2008/0110618 A1 | 5/2008 | Quintero et al. | |
| 2008/0119374 A1 | 5/2008 | Willberg et al. | |
| 2008/0121395 A1 | 5/2008 | Reddy et al. | |
| 2008/0194435 A1 | 8/2008 | Huff et al. | |
| 2008/0236823 A1 | 10/2008 | Willberg et al. | |
| 2009/0008091 A1 | 1/2009 | Quintero et al. | |
| 2009/0111716 A1 | 4/2009 | Hough et al. | |
| 2010/0056405 A1 | 3/2010 | Ali et al. | |
| 2010/0081586 A1 | 4/2010 | Smith et al. | |
| 2010/0081587 A1 | 4/2010 | van Zanten et al. | |
| 2010/0263863 A1 | 10/2010 | Quintero et al. | |
| 2010/0300759 A1 | 12/2010 | Passade-Boupat et al. | |
| 2010/0314118 A1* | 12/2010 | Quintero et al. | 166/308.1 |
| 2011/0005773 A1 | 1/2011 | Dusterhoft et al. | |
| 2011/0048716 A1 | 3/2011 | Ezell | |
| 2011/0048718 A1 | 3/2011 | Van Zanten et al. | |
| 2011/0053812 A1 | 3/2011 | Ezell et al. | |
| 2011/0071056 A1 | 3/2011 | Saini et al. | |

FOREIGN PATENT DOCUMENTS

| | | |
|---|---|---|
| GB | 2 383 355 A | 6/2003 |
| GB | 2457151 A | 8/2009 |
| WO | WO01/42387 A2 | 6/2001 |
| WO | WO 02/070862 A1 | 9/2002 |
| WO | WO02070862 A1 | 9/2002 |
| WO | WO2006/029019 A2 | 3/2006 |
| WO | WO2006/029019 A3 | 3/2006 |
| WO | WO2008/045734 A2 | 4/2008 |
| WO | WO2008/045734 A3 | 4/2008 |
| WO | WO 2009/006251 A1 | 1/2009 |
| WO | WO 2009/030868 A2 | 3/2009 |
| WO | WO2011/023966 A1 | 3/2011 |
| WO | WO 2012/001361 A1 | 1/2012 |
| WO | WO 2012/038704 A1 | 3/2012 |

OTHER PUBLICATIONS

International Search Report and Written Opinion for PCT/GB2010/001631 dated Oct. 19, 2010.
International Preliminary Report on Patentability for PCT/GB2010/0001629 dated Mar. 15, 2012.
Schlumberger, ClearFRAC LT Surfactant Article, Apr. 2005.
Crews et al., New Technology Improves Performance of Viscoelastic Surfactant Fluids, SPE-Drilling & Completion, 23, 41-47, 2008.
Samuel et al., Polymer-Free Fluid for Hydraulic Fracturing, SPE 38622, 1997.
Samuel, et al., A New Solids-Free Non-Damaging High Temperature Lost-Circulation Pill: Development and First Field Applications, SPE 81494, 2003.
Massiera et al., Hairy Wormlike Micelles: Structure and Interactions, Langmuir, 18, 5867-5694, 2002.
Massiera et al., The Steric Polymer Layer of Hairy Wormlike Michelles, Journal of Physics: Condensed Matter, 15, S225-S231, 2003.
Ramos et al., Structure of a New Type of Transient Network: Entangled Wormlike Micelles Bridged by Telechelic Polymers, Macromolecules, 40, 1248-1251, 2007.
Van Zanten, Dissertation, University of California Santa Barbara, pp. 74-143, 2007.
Ingram et al., Enhancing and Sustaining Well Production: Granite Wash, Texas Panhandle, SPE 106531, 2007.
Hellweg, Phase Structures of Microemulsions, Current Opinion in Colloid and Interface, Science 7, 50-56, 2003.
Kunieda et al., Effect of Added Salt on the Maximum Solubilization in an Ionic-Surfactant Microemulsion, Langmuir, 12, 5796-5799, 1996.
Gotch, et al., Formation of Single-Phase Microemulsions in Toluene/Water/Nonionic Surfactant Systems, Langmuir, 24, 4485-4493, 2008.
Welton, et al., Anionic Surfactant Gel Treatment Fluid, Society of Petroleum Engineers, SPE 105815, 2007.

* cited by examiner

TETHERED POLYMERS USED TO ENHANCE THE STABILITY OF MICROEMULSION FLUIDS

BACKGROUND

The present invention relates to methods and compositions that may be useful in treating subterranean formations, and more specifically, to polymeric additives used with microemulsion surfactants, fluids comprising such additives and microemulsion surfactants, and associated methods of use.

Viscosified treatment fluids may be used in a variety of subterranean treatments. As used herein, the term "treatment," or "treating," refers to any subterranean operation that uses a fluid in conjunction with a desired function and/or for a desired purpose. The term "treatment," or "treating," does not imply any particular action by the fluid. Examples of common subterranean treatments include, but are not limited to, drilling operations, pre-pad treatments, fracturing operations, perforation operations, preflush treatments, afterflush treatments, sand control treatments (e.g., gravel packing), acidizing treatments (e.g., matrix acidizing or fracture acidizing), diverting treatments, cementing treatments, and well bore clean-out treatments.

For example, in certain fracturing treatments generally a treatment fluid is introduced into a well bore that penetrates a subterranean formation at a sufficient hydraulic pressure to create or enhance one or more pathways, or "fractures," in the subterranean formation. These cracks generally increase the permeability of that portion of the formation. The fluid may comprise particulates, often referred to as "proppant particulates," that are deposited in the resultant fractures. The proppant particulates are thought to help prevent the fractures from fully closing upon the release of the hydraulic pressure, forming conductive channels through which fluids may flow to a well bore penetrating the formation.

Treatment fluids are also utilized in sand control treatments, such as gravel packing. In "gravel-packing" treatments, a treatment fluid suspends particulates (commonly referred to as "gravel particulates"), and at least a portion of those particulates are then deposited in a desired area in a well bore, e.g., near unconsolidated or weakly consolidated formation zones, to form a "gravel pack," which is a grouping of particulates that are packed sufficiently close together so as to prevent the passage of certain materials through the gravel pack. This "gravel pack" may, inter alia, enhance sand control in the subterranean formation and/or prevent the flow of particulates from an unconsolidated portion of the subterranean formation (e.g., a propped fracture) into a well bore. One common type of gravel-packing operation involves placing a sand control screen in the well bore and packing the annulus between the screen and the well bore with the gravel particulates of a specific size designed to prevent the passage of formation sand. The gravel particulates act, inter alia, to prevent the formation sand from occluding the screen or migrating with the produced hydrocarbons, and the screen acts, inter alia, to prevent the particulates from entering the well bore. The gravel particulates also may be coated with certain types of materials, including resins, tackifying agents, and the like. Once the gravel pack is substantially in place, the viscosity of the treatment fluid may be reduced to allow it to be recovered.

In some situations, fracturing and gravel-packing treatments are combined into a single treatment (commonly referred to as a "Frac Pac"™ operation). In such "frac pac" operations, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Maintaining sufficient viscosity in treatment fluids may be important for a number of reasons. Viscosity is desirable in drilling operations since treatment fluids with higher viscosity can, among other things, transport solids, such as drill cuttings, more readily. Typical drilling fluids are viscous fluids that form emulsions and can be classified according to their base fluid. As used herein, a drilling operation includes, but is not limited to, a drilling operation, a drill-in operation, an underbalanced drilling operation, an overbalanced drilling operation, and any other drilling operation known to one of ordinary skill in the art. Water-based muds comprise an aqueous fluid as the continuous phase. Solid particles can be suspended in water or brine, and in some cases, oil can be emulsified in the water. Similarly, brine-based drilling fluids are water-based muds in which the aqueous fluid is a brine. Oil-based muds (OBM) are the opposite such that oil is the continuous phase. Solid particles can be suspended in oil, and in some cases, water or brine can be emulsified in the oil. The oil continuous phase typically includes, diesel, mineral oil, esters, or alpha-olefins.

Similarly, maintaining viscosity is desirable in fracturing treatments for particulate transport, as well as to create or enhance fracture width. Particulate transport is also important in sand control treatments, such as gravel packing. Maintaining sufficient viscosity may be important to control and/or reduce leak-off into the formation, improve the ability to divert another fluid in the formation, and/or reduce pumping requirements by reducing friction in the well bore. At the same time, while maintaining sufficient viscosity of a treatment fluid often is desirable, it also may be desirable to maintain the viscosity of the treatment fluid in such a way that the viscosity may be reduced at a particular time, inter alia, for subsequent recovery of the fluid from the formation.

To provide the desired viscosity, polymeric gelling agents commonly are added to the treatment fluids. The term "gelling agent" is defined herein to include any substance that is capable of increasing the viscosity of a fluid, for example, by forming a gel. Examples of commonly used polymeric gelling agents include, but are not limited to guar gums and derivatives thereof, cellulose derivatives, biopolymers, and the like. The use of polymeric gelling agents, however, may be problematic. For instance, these polymeric gelling agents may leave an undesirable gel residue in the subterranean formation after use, which can impact permeability. As a result, costly remedial operations may be required to clean up the fracture face and proppant pack. Foamed treatment fluids and emulsion-based treatment fluids have been employed to minimize residual damage, but increased expense and complexity often have resulted.

To combat perceived problems associated with polymeric gelling agents, some surfactants have been used as gelling agents. It is well understood that, when mixed with an aqueous fluid in a concentration above the critical micelle concentration, the molecules (or ions) of surfactants may associate to form micelles. The term "micelle" is defined to include any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure. These micelles may function, among other purposes, to stabilize emulsions, break emulsions, stabilize a foam, change the wettability of a surface, solubilize certain materials, and/or reduce surface tension. When used as a gelling agent, the molecules (or ions) of the surfactants used associate to form micelles of a certain micellar structure (e.g., rodlike, wormlike, vesicles, etc., which are referred to herein as "viscosifying micelles") that, under certain conditions (e.g., concentration, ionic strength of the fluid, etc.) are capable of, inter alia, imparting increased viscosity to a particular fluid and/or forming a gel. Certain viscosifying micelles may impart increased viscosity to a fluid such that the fluid exhibits viscoelastic behavior (e.g., shear thinning properties) due, at least in part, to the association of the surfactant molecules contained therein.

However, the use of surfactants as gelling agents may be problematic in several respects. In certain applications, large quantities of viscoelastic surfactants may be required to impart the desired rheological properties to a fluid. Certain viscoelastic surfactants may be less soluble in certain fluids, which may impair the ability of those surfactants to form viscosifying micelles. Viscoelastic surfactant fluids also may be unstable at high temperatures and/or in high salt concentrations due to, among other things, the tendency of high salt concentrations to "screen out" electrostatic interactions between viscosifying micelles.

SUMMARY

The present invention relates to methods and compositions that may be useful in treating subterranean formations, and more specifically, to polymeric additives used with microemulsion surfactants, fluids comprising such additives and microemulsion surfactants, and associated methods of use.

In an embodiment, a method comprises: providing a treatment fluid comprising: an aqueous fluid, a microemulsion surfactant, and an amphiphilic polymer, wherein the amphiphilic polymer comprises a hydrophobic component, and a hydrophilic component; and introducing the treatment fluid into a subterranean formation, wherein the microemulsion surfactant forms a microemulsion that comprises the amphiphilic polymer within the subterranean formation.

In another embodiment, a method comprises: providing a treatment fluid comprising an aqueous fluid, a microemulsion surfactant, and an amphiphilic polymer, wherein the amphiphilic polymer comprises: a hydrophobic component selected from the group consisting of: an alkyl group, a polybutadiene group, a polyisoprene group, a polystyrene group, a polyoxystyrene group, any derivative thereof, and any combination thereof; and a hydrophilic component selected from the group consisting of: a polyethylene oxide group; a polyacrylic acid group, a polyethylacetate group, a dimethylacrylamide group, an n-isopropylacrylamide group, a polyvinylpyrrolidone group, a polyethyleneimine group, any derivative thereof, and any combination thereof; and introducing the treatment fluid into at least a portion of a subterranean formation, wherein the microemulsion surfactant forms a microemulsion that comprises the amphiphlic polymer within the subterranean formation.

In still another embodiment, a treatment fluid comprises: an aqueous fluid; a microemulsion surfactant; and an amphiphilic polymer that comprises a hydrophobic component, and a hydrophilic component.

The features and advantages of the present invention will be apparent to those skilled in the art. While numerous changes may be made by those skilled in the art, such changes are within the spirit of the invention.

DESCRIPTION OF THE PREFERRED EMBODIMENTS

The present invention relates to methods and compositions that may be useful in treating subterranean formations, and more specifically, to polymeric additives used with microemulsion surfactants, fluids comprising such additives and microemulsion surfactants, and associated methods of use.

While some advantages are disclosed, not all advantages will be discussed herein. It has been discovered that the use of a treatment fluid capable of forming a microemulsion in-situ in combination with suitable polymers can result in a more stable microemulsion fluid capable of carrying a greater amount of oleaginous fluid within the micelles even with reduced concentrations of surfactant. Without intending to be limited by theory, the use of a treatment fluid comprising the stabilized microemulsions may result in improved water wetting of surfaces in a subterranean formation, oil-solubilization, and cleaning of the well during use of the treatment fluid. These treatment fluids may also allow for the density of the treatment fluid to be increased during use as the use of an amphiphilic polymer along with the microemulsion surfactant may allow for a reduced amount of surfactant to be used, allowing an increased amount of weighting agent to be included. Treatment fluids comprising microemulsion surfactants and amphiphilic polymers may also be more economic due to the decreased amount of surfactant required in some embodiments. In addition, the use of the treatment fluids of the present invention may allow for a retained producibility greater than other treatment techniques when used in a drilling operation. For example, the use of a treatment fluid of the present invention in a drilling operation can result in a retained producibility that is higher than that obtained by using a conventional drilling fluid along with one or more post drilling treatments. As used herein, "retained producibility" refers to the relative permeability of a formation after exposure to a drilling fluid divided by the permeability of the formation prior to exposure to a drilling fluid. In some embodiments, the retained producibility may be greater than 100%, which may indicate that the permeability of the formation is higher after contact with the treatment fluids described herein than the permeability of the formation before contact with the treatment fluid. The ability to increase the permeability of the formation or stimulate the formation using the treatment fluid may represent one advantage of the present invention.

In general, microemulsions are thermodynamically stable, macroscopically homogeneous mixtures of three or more components: a polar phase, a nonpolar phase and a surfactant, which can include more than one surfactant (e.g., with a cosurfactant such as an alcohol, glycol or phenol, or their ethoxy derivatives). In some embodiments, cosurfactants may be included when ionic surfactants are used. Microemulsions can form spontaneously and are generally thermodynamically stable. Microemulsion phase formulations can generally be described by Winsor type, including Winsor I, Winsor II and Winsor III. These types are generally described by: Winsor I when it contains a microemulsion in equilibrium with an excess oil phase; Winsor II when it contains a microemulsion in equilibrium with excess water; and Winsor III when it contains a middle phase microemulsion in equilibrium with excess water and excess oil (e.g., as a part of a three-phase system). In addition, a Winsor IV is often a single-phase microemulsion that has no excess oil or excess water. The thermodynamically stable single phase Winsor IV microemulsion could evolve by a change in formulation or composition into the formation of a miniemulsion or nanoemulsion, which is a two-phase system with submicron size droplets, which could be stable for a relatively long period of time, but not permanently stable as a microemulsion.

The formation of the micro-emulsion is thermodynamically favorable and can therefore form with or without circulation of the treatment fluid. The microemulsion can advantageously form in-situ upon contact of the microemulsion surfactant and an oleaginous fluid, or it can be formed on the surface between a microemulsion surfactant and one or more non-polar fluids. Thus, a microemulsion surfactant can be used to deliver a non-polar fluid (e.g., a lubricant) to the wellbore during a treatment operation while simultaneously forming an in-situ microemulsion with an oleaginous fluid encountered in the wellbore. In addition, the use of a treatment fluid comprising a microemulsion surfactant can be used to alter the wettability of the formation surface, remove oil and/or water blocks, and alter the wettability of a filter cake or other fluid loss additive placed into the subterranean formation during a treatment operation. The ability to alter the wettability of a filter cake can improve the damage remediation (filter cake destruction) when mineral acids, organic acids, oxidizing agents, water-soluble enzymes (e.g. catalysts), chelating agents and in situ acid generators are spotted into a wellbore after or during a treatment process. Another advantage of the treatment fluids described herein is that the treatment fluid does not require any oil or solvent in the formulation. As a result, the treatment fluids can have a higher loading capacity for incorporation of an oleaginous fluid or a non-polar fluid.

The use of a treatment fluid comprising an amphiphilic polymer may improve the stability of a microemulsion fluid. Without intending to be limited by theory, the addition of an amphiphilic polymer may stabilize the various microemulsion phases. Such an effect may be achieved due to a tuning of the curvature of the surfactant film with the hydrophilic and hydrophobic blocks that make up the amphiphilic polymers. The amphiphilic polymers may integrate into the surfactant film to form a "tethered polymer," resulting in a stabilization of various surfactant structures ranging from micelles to flat bi-layers. The stabilization can create an "efficiency boosting effect," allowing the surfactant structures to absorb more non-polar and/or oleaginous fluid and remain in a single phase. In an embodiment, the stabilized microemulsion treatment fluids of the present invention may absorb up to 50% more, or alternatively, up to 60% more non-polar and/or oleaginous fluid than other emulsions or microemulsion fluids not comprising amphiphilic polymer(s).

In an embodiment, a method according to the present invention comprises providing a treatment fluid comprising an aqueous fluid, a microemulsion surfactant, and an amphiphilic polymer. A microemulsion surfactant useful with the present invention may form a microemulsion with an oleaginous fluid within the wellbore. In some embodiments, the treatment fluid may comprise a microemulsion surfactant or a surfactant blend and often a surfactant-co-surfactant mixture, in which the co-surfactant can be a short amphiphilic substance such as an alcohol (e.g., propanol, butanol, pentanol in their different isomerization structures, as well as glycols, and ethoxyated and propoxylated alcohols or phenols).

The aqueous fluid used in the treatment fluids of the present invention can comprise any suitable aqueous fluid known to one of ordinary skill in the art. Suitable aqueous fluids may include, but are not limited to, fresh water, saltwater (e.g., water containing one or more salts dissolved therein), brine (e.g., saturated saltwater), weighted brine (e.g., an aqueous solution of sodium bromide, calcium bromide, zinc bromide and the like), or any combination thereof. Generally, the aqueous fluid may be from any source, provided that it does not contain components that might adversely affect the stability and/or performance of the treatment fluids of the present invention. In certain embodiments, the density of the aqueous fluid can be increased, among other purposes, to provide additional particle transport and suspension in the treatment fluids of the present invention using, for example, one or more salts. Although an aqueous fluid can be used to form the microemulsions, it will be appreciated that in some embodiments other polar liquids such as alcohols and glycols, alone or together with an aqueous fluid, may also be used. In an embodiment, the aqueous fluid is present in the treatment fluid in an amount ranging from about 40% to about 99.9% by weight of the treatment fluid.

The treatment fluids of the present invention comprise one or more microemulsion surfactants. A microemulsion surfactant can include any surfactant capable of forming a microemulsion in a treatment fluid comprising an aqueous fluid and a non-polar fluid and/or an oleaginous fluid, alone or in combination with a co-surfactant. Suitable microemulsion surfactants suitable for use with the treatment fluids of the present invention include, but are not limited to, non-ionic, anionic, cationic and amphoteric surfactants, any derivatives thereof, and any combination thereof. Suitable non-ionic surfactants include, but are not limited to, alkyl polyglycosides, sorbitan esters, methyl glucoside esters, amine ethoxylates, diamine ethoxylates, polyglycerol esters, alkyl ethoxylates, alcohols that have been polypropoxylated and/or polyethoxylated or both, any derivative thereof, or any combination thereof. The term "derivative," as used herein refers to any compound that is made from one of the identified compounds, for example, by replacing one atom in the listed compound with another atom or group of atoms, or rearranging two or more atoms in the listed compound. Suitable cationic surfactants include, but are not limited to, arginine methyl esters, alkanolamines, alkylenediamides, alkyl ester sulfonates, alkyl ether sulfonates, alkyl ether sulfates, alkali metal alkyl sulfates, alkyl or alkylaryl sulfonates, sulfosuccinates, alkyl or alkylaryl disulfonates, alkyl disulfates, alcohol polypropoxylated and/or polyethoxylated sulfates, taurates, amine oxides, alkylamine oxides, ethoxylated amides, alkoxylated fatty acids, alkoxylated alcohols, ethoxylated fatty amines, ethoxylated alkyl amines, betaines, modified betaines, alkylamidobetaines, quaternary ammonium compounds, alkyl propoxyethoxysulfonate, alkyl propoxy-ethoxysulfate, alkylaryl-propoxy-ethoxysulfonate, any derivative thereof, and any combination thereof. Specific surfactants may include, but are not limited to, polyoxyethylene sorbitan monopalmitate, polyoxyethylene sorbitan monostearate, polyoxyethylene sorbitan monooleate, linear alcohol alkoxylates, alkyl ether sulfates, dodecylbenzene sulfonic acid, linear nonyl-phenols, dioxane, ethylene oxide, polyethylene glycol, ethoxylated castor oils, dipalmitoyl-phosphatidylcholine, sodium 4-(1' heptylnonyl)benzenesulfonate, polyoxyethylene nonyl phenyl ether, sodium dioctyl sulphosuccinate, tetraethyleneglycoldodecylether, sodium octylbenzenesulfonate, sodium hexadecyl sulfate, sodium laureth sulfate, ethylene oxide, decylamine oxide, dodecylamine betaine, dodecylamine oxide, any derivative thereof, or any combination thereof. In one non-limiting embodiment at least two surfactants in a blend may be used to create single phase microemulsion in-situ. Suitable microemulsion surfactants may also include surfactants containing a non-ionic spacer-arm central extension and an ionic or nonionic polar group. The non-ionic spacer-arm central extension may be the result of polypropoxylation, polyethoxylation, or a mixture of the two, in non-limiting embodiments.

The amount of microemulsion surfactant included in the treatment fluid may be based on a number of factors including, but not limited to, the type of aqueous fluid, the temperature of the formation, the particular surfactant or surfactant blend used, the type and amount of amphiphilic polymer used, and the type of optional additives included. In some embodiments, the microemulsion surfactant is present in the treatment fluid in an amount of from about 0.01% to about 50% by weight of the treatment fluid. In some embodiments, the microemulsion surfactant is present in the treatment fluid in an amount of from about 0.1% to about 20% by weight of the treatment fluid.

In an embodiment, a treatment fluid may comprise a co-surfactant. As used herein, a "co-surfactant" refers to a compound that participates in aggregation of molecules into a micelle but does not aggregate on its own. Suitable co-surfactants useful with the treatment fluids of the present invention include, but are not limited to, alcohols, glycols, phenols, thiols, carboxylates, sulfonates, ketones, acryl amides, pyrolidones, any derivative thereof, and any combination thereof. In an embodiment, an alcohol useful as a co-surfactant may have from about 3 to about 10 carbon atoms. In an embodiment, suitable alcohols can include, but are not limited to, t-butanol, n-butanol, n-pentanol, n-hexanol, 2-ethyl-hexanol, propanol, and sec-butanol. Suitable glycols can include, but are not limited to, ethylene glycol, polyethylene glycol, propylene glycols, and triethylene glycol. In an embodiment, a co-surfactant may be included in the treatment fluids of the present invention in an amount ranging from about 0.01% to about 20% by weight of the treatment fluid.

As an advantage of the treatment fluids of the present invention, a solvent is not required as a component of the treatment fluid. As a result of not having a solvent, the treatment fluids can have a higher loading capacity for incorporation of an oleaginous fluid or a non-polar fluid. In an embodiment, typical solvents that are not required in the present invention may comprise a terpene-based solvent, an alkyl acid ester of a short chain alcohol, an aryl acid ester of a short chain alcohol, benzene, toluene, xylene, or any other solvents known to one of ordinary skill in the art for use in a wellbore.

The amphiphilic polymer(s) used in the present invention may comprise a variety of polymers known in the art that comprise a hydrophobic component and a hydrophilic component. In some embodiments, the amphiphilic polymer(s) may comprise between 2 and 50 monomer units. In some embodiments, the amphiphilic polymer(s) may comprise between 2 and 10 monomer units. Examples of hydrophobic components that may be suitable for use include, but are not limited to alkyl groups, polybutadiene, polyisoprene, polystyrene, polyoxystyrene, any derivatives thereof, and any combinations thereof. Examples of hydrophilic components that may be suitable for use include, but are not limited to, polyethylene oxide (PEO), polyacrylic acid (PAA), polyethylacetate, dimethylacrylamide (DMA), n-isopropylacrylamide (NIPAM), polyvinylpyrrolidone (PVP), polyethyleneimine (PEI), any derivatives thereof, and any combinations thereof. Examples of amphiphilic polymers that may be suitable for use include, but are not limited to polybutadiene-PEO, polystyrene-PEO, polystyrene-polyacrylic acid, polyoxystyrene-PEO, polystyrene-polyethylacetate, any derivatives thereof, and any combinations thereof. Other examples of amphiphilic polymers that may be suitable for use in the present invention include those that comprise units based on one or more of the following: acrylamides, vinyl alcohols, vinylpyrrolidones, vinylpyridines, acrylates, polyacrylamides, polyvinyl alcohols, polyvinylpyrrolidones, polyvinylpyridines, polyacrylates, polybutylene succinate, polybutylene succinate-co-adipate, polyhydroxybutyrate-valerate, polyhydroxybutyrate-covalerate, polycaprolactones, polyester amides, polyethylene terephthalates, sulfonated polyethylene terephthalate, polyethylene oxides, polyethylenes, polypropylenes, aliphatic aromatic copolyester, polyacrylic acids, polysaccharides (such as dextran or cellulose), chitins, chitosans, proteins, aliphatic polyesters, polylactic acids, poly(glycolides), poly($\epsilon$-caprolactones), poly(hydroxy ester ethers), poly(hydroxybutyrates), poly(anhydrides), polycarbonates, poly(orthoesters), poly(amino acids), poly(ethylene oxides), poly(propylene oxides), poly(phosphazenes), polyester amides, polyamides, polystyrenes, any derivative thereof, any copolymer, homopolymer, or terpolymer, or any blend thereof. In certain embodiments, the amphiphilic polymer may comprise a compound selected from the group consisting of hydroxyethyl acrylate, acrylamide and hydroxyethyl methacrylate.

In certain embodiments, the amphiphilic polymer(s) may comprise one or more alkyl ethoxylates. In certain embodiments, the alkyl ethoxylate may comprise an alkyl group, and an ethoxylate group. In certain embodiments, the hydrophilic component may be larger and, for example, have at least 20 oxyethylene units. In certain embodiments, the hydrophilic component may be larger and, for example, have at least 40 oxyethylene units. Commercially available sources of such amphiphilic polymers that may be suitable for use in the present invention include, but are not limited to, certain detergents available under the tradename BRIJ®, such as BRIJ®-30 (comprises polyethylene glycol dodecyl ether), BRIJ®-35 (comprises polyoxyethyleneglycol dodecyl ether), BRIJ®-58 (comprises polyethylene glycol hexadecyl ether), BRIJ®-97 (comprises polyoxyethylene (10) oleyl ether), BRIJ®-98 (comprises polyoxyethylene (20) oleyl ether), and BRIJ®-700 (comprises polyoxyethylene (100) stearyl ether). Other commercially available sources of such amphiphilic polymers that may be suitable for use in the present invention include, certain detergents available under the tradename IGEPAL®.

The amphiphilic polymer should be present in a fluid of the present invention in an amount sufficient to impart the desired viscosity (e.g., sufficient viscosity to divert flow, reduce fluid loss, suspend particulates, etc.) to the fluid. In certain embodiments, the amphiphilic polymer may be present in the treatment fluid in an amount in the range of from about 0.01 mol % to about 5 mol % based on the amount of the microemulsion surfactant. In some instances, the presence of excessive amounts of amphiphilic polymer may reduce the stability of the viscoelastic surfactant fluid (e.g., may reduce the viscosity of the fluid). A person of ordinary skill in the art, with the benefit of this disclosure, will recognize the amount of amphiphilic polymer that may produce these effects in a particular application of the present invention, and determine when they should be avoided or employed. For example, certain embodiments of the present invention may comprise adding sufficient amounts of the amphiphilic polymer to reduce the viscosity of the fluid, among other purposes, to permit the fluid to leak off into a subterranean formation.

The fluids used in methods of the present invention optionally may comprise any number of additional additives, including, but not limited to, salts, acids, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, relative permeability modifiers, resins, particulate materials (e.g., proppant particulates), wetting agents, coating enhancement agents, and the like. In certain embodiments, the fluids and additives of the present invention may not comprise a substantial amount of a zwitterionic surfactant. A person skilled in the art, with the benefit of this disclosure, will recognize the types of additives that may be included in the fluids of the present invention for a particular application. In some embodiments, any additional additives may be included in the treatment fluids in an amount in the range of about 0.001% to about 10% by weight of the treatment fluid composition. One of ordinary skill in the art with the benefit of this disclosure will recognize that the compatibility of any given additive should be tested to ensure that it does not adversely affect the performance of the consolidating agent emulsion.

In an embodiment, the in-situ fluid may contain a non-polar fluid as an optional additional additive. The non-polar fluid can comprise a variety of additives useful for treating a wellbore in a subterranean formation. In an embodiment, the treatment fluid of the present invention can form a microemulsion with one or more non-polar fluids to allow the transportation of the non-polar fluids into the subterranean formation as part of the treatment fluid. The treatment fluid may then be capable of delivering at least a portion of the non-polar fluid to a desired location within the subterranean formation during a treatment operation. For example, the treatment fluid may be contacted with a non-polar fluid comprising a lubricant to form a microemulsion. In an embodiment in which the treatment fluid is used to drill a wellbore, the lubricant may aid in the lubrication of the drill bit. In an embodiment, any number of non-polar fluids may be used to form a microemulsion for delivery to the subterranean formation during a treatment operation. In an embodiment, a non-polar fluid can form a microemulsion with the microemulsion surfactant and the amphiphilic polymer in addition to the treatment fluid being able to form a microemulsion with an oleaginous fluid within the subterranean formation. As noted above, the treatment fluids of the present invention comprise an amphiphilic polymer and do not require a solvent or other non-polar liquid. As a result, the treatment fluids may comprise a higher capacity for the non-polar fluid additives and/or the oleaginous fluid. Suitable additives may include lubricants, which may include, but not limited to, ester based fluids, paraffins, isomerized olefins, mineral oils, and any combination thereof.

In an embodiment, a treatment fluid may comprise a fluid loss control agent for minimizing the loss of the treatment fluid into the subterranean formation. Suitable fluid loss control agents may include, but are not limited to, calcium carbonate, hematite, ilmenite, magnesium tetroxide, manganous oxide, iron carbonate, magnesium oxide, barium sulfate, and mixtures thereof. Additional suitable fluid loss control agents may comprise sized salts. These sized salts may be dissolved with undersaturated water when desired. Suitable salts may include, but are not limited to, NaCl, KCl, NaBr, KBr, HCOOK, HCOONa, CaCl, $CaBr_2$, $ZnBr_2$ and combinations thereof. Fluid loss control agents generally comprise particles that may have a variety of individual sizes. Generally speaking, the particle size distribution of the fluid loss control agent must be sufficient to bridge across and seal the desired opening downhole. For example, if the pore throats (i.e., very small openings) on a portion of a subterranean formation are to be bridged, then it would be beneficial to use a fluid loss control agent with smaller particle size distribution. A suitable size distribution for this type of application would range from about 0.1 microns to about 200 microns.

In some embodiments, the treatment fluids used in the present invention may comprise a degradable fluid loss control agent. Degradable fluid loss control agents are used to, among other things, control leak off into a formation. Suitable degradable fluid loss control agents generally comprise degradable polymers including, but not limited to, polysaccharides, chitins, chitosans, proteins, aliphatic polyesters, poly(lactides), poly(glycolides), poly(ε-caprolactones), poly (hydrooxybutyrates), poly(anhydrides), aliphatic polycarbonates, poly(orthoesters), poly(amino acids), poly(ethylene oxides), polyphoshazenes, and mixtures thereof. In other embodiments, the treatment fluid may comprise degradable, hydratable gel particulates that can be broken down with breakers or through a change in pH; suitable degradable, hydratable gel particulates are described in U.S. Pat. No. 5,680,900, which is incorporated herein by reference in its entirety.

The treatment fluids of the present invention optionally may comprise one or more salts in addition to or in place of any salts used as fluid loss control agents. The salts may be organic or inorganic. Examples of suitable organic salts include but are not limited to aromatic sulfonates and carboxylates (e.g., p-toluene sulfonate, naphthalene sulfonate), hydroxynaphthalene carboxylates, salicylate, phthalate, chlorobenzoic acid, salicylic acid, phthalic acid, 5-hydroxy-1-naphthoic acid, 6-hydroxy-1-naphthoic acid, 7-hydroxy-1-naphthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, 3,4-dichlorobenzoate, trimethylammonium hydrochloride and tetramethylammonium chloride. Examples of suitable inorganic salts include water-soluble potassium, sodium, and ammonium salts, (e.g., sodium chloride, potassium chloride, and ammonium chloride), calcium chloride, calcium bromide, magnesium chloride and zinc halide salts. Any combination of the salts listed above also may be included in the fluids of the present invention.

The optional salt may be present in any practicable amount. In certain embodiments, the salt may be present in an amount in the range of from about 0.1% to about 30% by weight of the fluid. In certain embodiments, the salt may be present in an amount in the range of from about 0.1% to about 10% by weight of the fluid. The type(s) and amount of salts suitable in a particular application of the present invention may depend upon a variety of factors, such as the type(s) of microemulsion surfactant(s) present in the fluid, the composition of the aqueous-base fluid, the temperature of the fluid and/or the region of desired use, and the like. In certain embodiments of the present invention, the aqueous base fluid may comprise a brine that already includes a certain amount of salt. In these embodiments, additional salts may not be desired, or it may be desirable to remove salt from or add further salt to the brine in the preparation and/or use of a fluid of the present invention. A person of ordinary skill, with the benefit of this disclosure, will recognize when to include a salt in a particular application of the present invention, as well as the appropriate type and amount of salts to include.

In some embodiments, the treatment fluid may further comprise a foaming agent. As used herein, the term "foamed" also refers to co-mingled fluids. In certain embodiments, it may be desirable to foam the treatment fluid, inter alia, to reduce the amount of aqueous fluid that is required (e.g., in water sensitive subterranean formations). Various gases can be used for foaming the treatment fluids of this invention, including, but not limited to, nitrogen, carbon dioxide, air, methane, and mixtures thereof. One of ordinary skill in the art with the benefit of this disclosure will be able to select an appropriate gas that may be used for foaming the treatment fluids of the present invention. Suitable foaming agent surfactants may include, but are not limited to, betaines, amine oxides, methyl ester sulfonates, alkylamidobetaines such as cocoamidopropyl betaine, alpha-olefin sulfonate, trimethyltallowammonium chloride. $C_8$ to $C_{22}$ alkylethoxylate sulfate and trimethylcocoammonium chloride. Other suitable foaming agents and foam stabilizing agents may be included as well, which will be known to those skilled in the art with the benefit of this disclosure.

In some embodiments, the treatment fluid used in the present invention may further comprise a weighting agent. Weighting agents are used to, among other things, increase the fluid density and thereby affect the hydrostatic pressure exerted by the fluid. Examples of suitable weighting agents include, but are not limited to, salts including potassium chloride, sodium chloride, sodium bromide, calcium chloride, calcium bromide, ammonium chloride, zinc bromide, zinc formate, zinc oxide, and mixtures thereof.

In an embodiment, a treatment fluid may comprise an antifreeze agent to lower the freezing point of the treatment fluid. Other additives may be suitable as well as might be recognized by one skilled in the art with the benefit of this disclosure.

In certain embodiments, the methods of the present invention generally comprise: providing a treatment fluid comprising an aqueous fluid, a microemulsion surfactant, and an amphiphilic polymer, wherein the amphiphilic polymer comprises a hydrophobic component, and a hydrophilic component; and mixing the aqueous fluid, the microemulsion surfactant, and the amphiphilic polymer together to form a fluid of the present invention. The fluids of the present invention and/or any component thereof (e.g., the amphiphilic polymer) may be provided in any form that is suitable for the particular application of the present invention. In certain embodiments, the microemulsion surfactant and/or amphiphilic polymer may be provided as a liquid and/or solid additive that is admixed or incorporated at any point prior to and/or during use of the fluid. For example, in certain embodiments, the amphiphilic polymer may be added to a fluid that is already present in a portion of a subterranean formation. The different components of the fluids of the present invention may be provided or incorporated together (e.g., in the same additive or fluid), or they may be provided or incorporated into a fluid as separate additives. Where they are provided or incorporated into a fluid separately, the different components may be provided or incorporated simultaneously, or certain components may be provided or incorporated at some point in time before or after the other components are provided or incorporated. The fluids of the present invention and/or any component thereof may be prepared at a job site, or they may be prepared at a plant or facility prior to use, and may be stored for some period of time prior to use. In certain embodiments, the preparation of these fluids of the present invention may be done at the job site in a method characterized as being performed "on-the-fly." The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing.

In certain embodiments, the methods of the present invention comprise: providing a treatment fluid comprising an aqueous fluid, a microemulsion surfactant, and an amphiphilic polymer, wherein the amphiphilic polymer comprises a hydrophobic component, and a hydrophilic component; and introducing the treatment fluid into a subterranean formation, wherein the microemulsion surfactant forms a microemulsion that comprises the amphiphilic polymer within the subterranean formation. In these methods, the treatment fluid (and/or the separate components thereof) may be introduced into a portion of a subterranean formation by any means known in the art.

The methods and treatment fluids of the present invention may be used during or in preparation for any subterranean operation wherein a fluid may be used. Suitable subterranean operations may include, but are not limited to, preflush treatments, afterflush treatments, drilling operations, hydraulic fracturing treatments, sand control treatments (e.g., gravel packing), acidizing treatments (e.g., matrix acidizing or fracture acidizing), "frac-pack" treatments, well bore clean-out treatments, and other operations where a treatment fluid of the present invention may be useful. For example, in certain embodiments, the present invention provides fluids that comprise an aqueous fluid, a viscoelastic surfactant, an amphiphilic polymer that comprises an aqueous fluid; a microemulsion surfactant; and an amphiphilic polymer that comprises a hydrophobic component, and a hydrophilic component. In certain embodiments, a treatment fluid of the present invention may be used in a method of fracturing a subterranean formation, wherein a treatment fluid of the present invention is introduced into the subterranean formation at or above a sufficient hydraulic pressure to create or enhance one or more cracks, or "fractures," in the subterranean formation. "Enhancing" one or more fractures in a subterranean formation, as that term is used herein, is defined to include the extension or enlargement of one or more natural or previously created fractures in the subterranean formation. This may, among other things, form conductive channels in the subterranean formation through which fluids (e.g., oil, gas, etc.) may flow to a well bore penetrating the subterranean formation.

In an embodiment, the treatment fluid may be used to drill into any portion of a subterranean formation including, but not limited to, a producing zone along a wellbore. As used herein, the term "drilling fluid" includes, but is not limited to, drilling fluids, drill-in fluids, and completion fluids. A "drill-in" fluid is generally a drilling fluid used to drill the wellbore into producing portions of a subterranean formation so as to minimize damage, maximize production of exposed zones, and facilitate any necessary well completion needed. Unlike a drilling fluid, a drill-in fluid generally contains few solids, and what solids it does contain are often size controlled to minimize penetration or invasion into the formation matrix to avoid damaging the production formation. In an embodiment, a method of drilling a wellbore through a subterranean formation comprises providing a treatment fluid comprising an aqueous fluid, a microemulsion surfactant, and an amphiphilic polymer, wherein the amphiphilic polymer comprises a hydrophobic component, and a hydrophilic component, and using the drilling fluid to drill at least a portion of a wellbore into a subterranean formation comprising an oleaginous fluid using the drilling fluid, wherein the microemulsion surfactant forms a microemulsion with the oleaginous fluid within the wellbore. In an embodiment, the drilling fluid may be used to drill at least a portion of a wellbore into the production zone of a subterranean formation.

In some embodiments, at least a portion of an oleaginous fluid within a subterranean formation may be a heavy hydrocarbon such as a tar, or asphaltene. In these embodiments, the treatment fluid may help remove at least a portion of the heavy hydrocarbons from the subterranean formation. In general, heavy hydrocarbons tend to form deposits on the casing and/or production equipment during drilling and production of the well. While not intending to be limited by theory, it is believed that the formation of a microemulsion with the oleaginous fluid comprising a heavy hydrocarbon may limit or prevent the heavy hydrocarbon from forming deposits as the encapsulation of the oleaginous fluid in a microemulsion comprising an amphiphilic polymer may limit or prevent it from contacting the sides of the wellbore and/or any process equipment.

In an embodiment, the treatment fluid disclosed herein can be used to alter the wettability of a filter cake and/or the subterranean formation. When a filter cake and/or the formation face is oil wet, compatibility problems can arise for certain completion operations, such as water injection and gravel packing. By altering the wettability of a filter cake and/or the formation face to be more water wet, the filter cake may be more compatible with injection water and brine-based gravel pack carrier fluids. In addition, a water wetting filter cake can be more easily removed with an aqueous based clean-up fluid (e.g., a fluid comprising mineral acids, organic acids, oxidizing agents, water soluble enzymes, and in situ acid generators) if necessary.

In an embodiment, the treatment fluid disclosed herein can be used to remove a water block or oil block within a subterranean formation. A water block generally refers to a condition caused by an increase in water saturation in the near-wellbore area. A water block can form when the near-wellbore area is exposed to a relatively high volume of filtrate from the drilling fluid. The increased presence of water may cause any clay present in the formation to swell and cause a reduction in permeability and/or the water may collect in the pore throats, resulting in a decreased permeability due to an increased capillary pressure and cohesive forces. Similarly, an oil block generally refers to a condition in which an increased amount of oil saturates the area near the wellbore. Due to the wettability of the subterranean formation and the resulting capillary pressure, the oil may reduce the permeability of the subterranean formation to the flow of fluids, including oil and water. In an embodiment, the treatment fluids and methods described herein may be used to remove a water or oil block by removing at least a portion of the water and/or oil in the near wellbore area, and/or altering the wettability of the subterranean formation. This may directly or indirectly lead to reduced capillary pressure in the porosity of the formation. Reduced capillary pressure may lead to increased water and/or oil drainage rates. As will be appreciated, improved water-drainage rates should allow a reduction in existing water blocks, as well as a reduction in the formation of water blocks.

To facilitate a better understanding of the present invention, the following examples of certain aspects of some embodiments are given. In no way should the following examples be read to limit, or define, the scope of the invention.

EXAMPLES

In order to demonstrate that the use of the treatment fluid of the present invention can result in a more stable microemulsion fluid capable of carrying a greater amount of oleaginous fluid, a number of samples were prepared and the amount of oleaginous fluid solubilized was measured.

Example 1

Three samples were prepared with varying amounts of a microemulsion surfactant. Each sample had a total volume of 4 milliliters (mL). The samples comprised a 50/50 mixture by volume of a surfactant/brine mixture (2 mL of each mixture). The 2 mL surfactant mixture comprised 1.38 mL of a 30 wt % solution of lauryl betaine in water and 0.62 mL of butanol. The brine mixture comprised a sodium bromide brine with an equivalent density of 12.5 pounds per gallon. Three 4 mL samples were prepared and varying amounts of an amphiphilic polymer were added to each one. Sample 1 had no amphiphilic polymer in order to represent a control sample for comparison. Samples 2 and 3 had 4.5 wt % and 9 wt % of amphiphilic polymer (a polyethylene (100) stearyl ether commercially sold as BRIJ® 700, sold by, for example, SIGMA-ALDRICH of Milwaukee, Wis.), respectively. The ability of these samples to solubilize an oleaginous fluid was measured by adding diesel fuel to the mixtures and measuring the amount that was solubilized in a microemulsion. The results of each sample are shown in Table 1.

TABLE 1

Diesel Solubilization in Sample Mixtures

| Sample | Diesel Solubilized (mL) |
|---|---|
| Sample 1 | 0.7 |
| Sample 2 | 0.8 |
| Sample 3 | 1.1 |

Thus, the results indicate to one of ordinary skill in the art, that the use of a treatment fluid of the present invention can increase the ability of the fluid to solubilize an oleaginous fluid.

Example 2

Three additional samples were prepared with varying amounts of a different microemulsion surfactant. Each sample had a total volume of 4 milliliters (mL). The samples comprised a 50/50 mixture by volume of a surfactant/brine mixture (2 mL of each mixture). The 2 mL surfactant mixture comprised 1.38 mL of a 30 wt % solution of coco betaine in water and 0.62 mL of butanol. The brine mixture comprised a sodium bromide brine with an equivalent density of 12.5 pounds per gallon. Three 4 mL samples were prepared and varying amounts of an amphiphilic polymer were added to each one. Sample 4 had no amphiphilic polymer in order to represent a control sample for comparison. Samples 5 and 6 had 4.5 wt % and 9 wt % of amphiphilic polymer (a polyethylene (100) stearyl ether commercially sold as BRIJ® 700, sold by, for example, SIGMA-ALDRICH of Milwaukee, Wis.), respectively. The ability of these samples to solubilize an oleaginous fluid was measured by adding diesel fuel to the mixtures and measuring the amount that was solubilized in a microemulsion. The results of each sample are shown in Table 2.

TABLE 2

Diesel Solubilization in Sample Mixtures

| Sample | Diesel Solubilized (mL) |
| --- | --- |
| Sample 4 | 0.6 |
| Sample 5 | 0.8 |
| Sample 6 | 1.0 |

Thus, the results indicate to one of ordinary skill in the art, that the use of a treatment fluid of the present invention can increase the ability of the fluid to solubilize an oleaginous fluid.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

What is claimed is:

1. A method comprising:
    providing a treatment fluid comprising:
        an aqueous fluid,
        a microemulsion surfactant, and
        an amphiphilic polymer, wherein the amphiphilic polymer comprises at least one selected from the group consisting of polybutadienepolyethylene oxide, polystyrene-polyethylene oxide, polystyrene-polyacrylic acid, polyoxystyrene-polyethylene oxide, and polystyrene-polyethylacetate; and
    introducing the treatment fluid into a subterranean formation, wherein the microemulsion surfactant forms a microemulsion within the subterranean formation, the microemulsion comprising the amphiphilic polymer.

2. The method of claim 1 wherein microemulsion surfactant comprises a surfactant selected from the group consisting of: an anionic surfactant, a cationic surfactant, a zwitterionic surfactant, and any combination thereof.

3. The method of claim 2 wherein the microemulsion surfactant comprises at least one surfactant selected from the group consisting of: an arginine methyl ester, an alkanolamine, an alkylenediamide, an alkyl ester sulfonate, an alkyl ether sulfonate, an alkyl ether sulfate, an alkali metal alkyl sulfate, an alkyl or an alkylaryl sulfonate, a sulfosuccinate, an alkyl or alkylaryl disulfonate, an alkyl disulfate, an alcohol polypropoxylated sulfate, an alcohol polyethoxyalted sulfate, an alcohol polypropoxylated and polyethoxylated sulfate, a taurate, an amine oxide, an ethoxylated amide, an alkoxylated fatty acid, an alkoxylated alcohol, an ethoxylated fatty amine, an ethoxylated alkyl amine, a betaine, a modified betaine, an alkylamidobetaine, a quaternary ammonium compound, any derivative thereof, and any combination thereof.

4. The method of claim 1 wherein the microemulsion surfactant is present in the treatment fluid in an amount of from about 0.1% to about 20% by weight of the treatment fluid.

5. The method of claim 1 wherein the amphiphilic polymer is present in the treatment fluid in an amount of from about 0.01 mol % to about 5 mol % based on the amount of the microemulsion surfactant.

6. The method of claim 1 wherein introducing the treatment fluid into the subterranean formation comprises introducing the treatment fluid into the subterranean formation at or above a pressure sufficient to create or enhance one or more fractures in at least a portion of the subterranean formation.

7. The method of claim 1 wherein introducing the treatment fluid into the subterranean formation involves a subterranean operation selected from the group consisting of: a drilling operation, an underbalanced drilling operation, an overbalanced drilling operation, an acidizing operation, a gravel-packing operation, a fracturing operation, a frac-pack operation, a completion operation, and a cementing operation.

* * * * *